United States Patent [19]
Moriya et al.

[11] Patent Number: 5,299,029
[45] Date of Patent: Mar. 29, 1994

[54] IMAGE PROCESSING APPARATUS CAPABLE OF PREVENTING DETERIORATION IN IMAGE QUALITY

[75] Inventors: Shigeru Moriya, Toyokawa; Kaoru Tada, Aichi; Hideo Kumashiro, Toyokawa, all of Japan

[73] Assignee: Minolta Camera Kabushiki Kaisha, Osaka, Japan

[21] Appl. No.: 808,613

[22] Filed: Dec. 17, 1991

[30] Foreign Application Priority Data

Dec. 21, 1990 [JP] Japan .................................. 2-413369

[51] Int. Cl.⁵ ........................ H04N 1/40; H04N 1/393
[52] U.S. Cl. .................... 358/447; 358/451; 382/47
[58] Field of Search ............... 358/447, 451, 452, 428, 358/448, 443; 382/43, 47; H04N 1/40, 1/393

[56] References Cited

U.S. PATENT DOCUMENTS

| 4,614,977 | 9/1986 | Kawahara et al. | 358/428 |
| 4,725,892 | 2/1988 | Suzuki et al. | 358/451 |
| 4,860,118 | 8/1989 | Arimoto | 358/451 |

FOREIGN PATENT DOCUMENTS 2170373A  7/1986  United Kingdom .......... H04N 1/40

*Primary Examiner*—Edward L. Coles, Sr.
*Assistant Examiner*—Jerome Grant, II
*Attorney, Agent, or Firm*—Burns, Doane, Swecker & Mathis

[57] ABSTRACT

An image processing apparatus capable of contracting or enlarging an original image includes a variable scale magnification processing unit for magnifying the original image in accordance with a magnification m, and a digital filter for correcting an image quality. Since weighting matrixes h1-h5 of the digital filter are varied depending on magnification m, a deterioration in image quality can be prevented irrespectively of magnifications.

19 Claims, 7 Drawing Sheets

IMAGE PROCESSING APPARATUS CAPABLE OF PREVENTING DETERIORATION IN IMAGE QUALITY

BACKGROUND OF THE INVENTION

1. Field of the Invention

The present invention relates generally to image processing apparatuses for carrying out a variable scale magnification processing to contract or enlarge an original image and a filtering processing to maintain an image quality of the original image and, more particularly, to an image processing apparatus capable of preventing a deterioration in image quality irrespectively of variable scale magnifications.

2. Description of the Related Art

A digital copier is comprised of a scanning system for reading an original (original image) by fractionizing the same into pixels, an image processing apparatus for subjecting the read image to various image processings, and a printer apparatus for forming a copied image in accordance with image data subjected to the image processings.

An original is scanned normally by shifting a one-dimensional image sensor in a main scanning direction to a subscanning direction.

Major image processings are a tone processing for converting multi-valued data into binary data by a dither method or the like in order to reproduce a half tone, a gamma processing for correcting densities in accordance with visual characteristics, a processing for an image edition such as color changing, a variable scale magnification processing for enlarging and contracting an original image depending on a copying magnification, and the like.

In the variable scale magnification processing, when the original image is contracted, pixel data (which are, strictly speaking, information indicating the shade or the tone of pixels and hereinafter referred to as pixels) are skipped. When the original image is enlarged, pixels are increased. More specifically, in a variable scale magnification processing with the direction of variable scale magnification being a main scanning direction, if a variable scale magnification is, for example, "0.5", every other pixels arranged in the main scanning direction are skipped. If variable scale magnification is, for example, "3", the respective pixels are increased so that the same pixels are arranged three by three in the main scanning direction.

In a series of image reproducing steps such as a scanning of an original image, an image processing and a copying (image formation), an image quality deteriorates due to various factors in accordance with transmission of image information. For example, there occur image blurring due to aberration of an optical lens, Moiré fringe (a striped design) due to an interference with a dither pattern, and the like.

Thus, in addition to the foregoing processings, an image quality correction processing for maintaining the image quality of the original image has conventionally been carried in an image processing apparatus. The image quality correction processing can be divided into an input-side correction for restoring an image quality which is already deteriorated at the time when an image (image data) is input to the image processing apparatus, to the one before deteriorated and an output-side correction for adjusting an image quality in advance in view of the deterioration thereof after output from the image processing apparatus.

Normally, a so-called image quality emphasizing processing for intentionally adjusting the image quality in accordance with a subjective preference with respect to a copied image, e.g., an edge emphasis processing and a soft focus processing are carried out along with the image quality correction processing.

In the specification, processings other than the image quality correction processing which are made by the image processing apparatus are called "other processings."

In general, the image quality correction processing is carried out by employing a so-called discrete convolution operation (filter processing) using a digital filter of a predetermined matrix size in which an appropriate weighting matrix is determined for each pixel.

At that time, the input-side correction and the output-side correction can separately be carried out before and after other processings; however, in that case, two digital filters are necessary, so that a circuit configuration of the image processing apparatus becomes complicated. Also, a filter processing accompanied by data delay is carried out twice, so that an output of image data is delayed.

Accordingly, conventionally, a single digital filter in which a weighting matrix is elected is provided at a preceding stage or a succeeding stage of other processings so as to carry out both the input-side correction and the output-side correction at the same time, whereby an image quality correction is made by a single filter processing.

Conventionally, the weighting matrix of a digital filter is elected so that the image quality of an original image may be obtained upon, for example, equal scale magnification copying (variable scale magnification is 1), and its value is set to a fixed value.

Thus, there was a problem that the image quality deteriorates as the value of the variable scale magnification becomes distant from 1 in variable scale magnification copying.

That is to say, when an image quality correction processing is carried out before a variable scale magnification processing, if the weighting matrix of a digital filter is fixed to a value provided at the time of equal scale magnification, then the input-side correction becomes appropriate independently of variable scale magnification, however, the output-side correction becomes inappropriate at the time of variable scale magnification. Conversely, when the image quality correction processing is carried out after the variable scale magnification processing, if the weighting matrix is fixed to a value provided at the time of equal scale magnification, then the input-side correction becomes inappropriate at the time of variable scale magnification.

SUMMARY OF THE INVENTION

One object of the present invention is therefore to prevent a deterioration in image quality irrespectively of a variable scale magnification in an image processing apparatus.

Another object of the present invention is to stabilize an image quality with respect to arbitrary magnification of an image in an image processing apparatus.

A further object of the present invention is to reduce a memory capacity in an image processing apparatus.

The foregoing objects of the present invention are achieved by an image processing apparatus including the following elements. That is, an image processing apparatus including image data including a plurality of pixel data in accordance with the present invention includes: a variable scale magnification unit for varying the magnification of an image corresponding to the image data by increasing or decreasing the number of pixel data included in the image data; a first memory for storing a first group of weighting matrixes; a second memory for storing a predetermined function; a weighting matrix group determining unit for determining a second group of weighting matrixes in accordance with the magnification and the function stored in the second memory; an operation unit for operating a third group of weighting matrixes from the first weighting matrix group stored in the first memory and from the second weighting matrix group obtained by operation means; and a filter for filtering image data by employing a digital filter including the third weighting matrix group obtained by the operation means.

The second weighting matrix group is determined from the magnification of an image and a predetermined function, and the third weighting matrix group employed in the digital filter is determined from the second weighting matrix group and the first weighting matrix group. This makes it possible to prevent a deterioration in image quality irrespectively of a variable scale magnification in the image processing apparatus.

According to another aspect of the present invention, an image processing apparatus for processing image data including a plurality of pixel data includes: an input device for inputting a variable scale magnification of an image; a variable scale magnification unit for increasing or decreasing the number of pixel data included in image data in accordance with the variable scale magnification input by the input device; a first memory for storing a first weighting matrix group; a second memory for storing a predetermined function; an operation unit for operating a second weighting matrix group from a variable scale magnification, a function and the first weighting matrix group; and a filtering device for filtering image data by employing a digital filter including the second weighting matrix group obtained by the operation unit.

When a variable scale magnification is specified, second weighting matrixes corresponding to the specified variable scale magnification are calculated by using a predetermined function in accordance with the first weighting matrix group that is to be a reference stored in advance. Filtering is carried out by using the digital filter employing the calculated value. In this case, a memory capacity can be decreased as compared to the case where various groups of weighting matrixes corresponding to variable scale magnifications are stored in advance.

The memory capacity can be decreased in the image processing apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will now be described with reference to the drawings.

Figure 4:
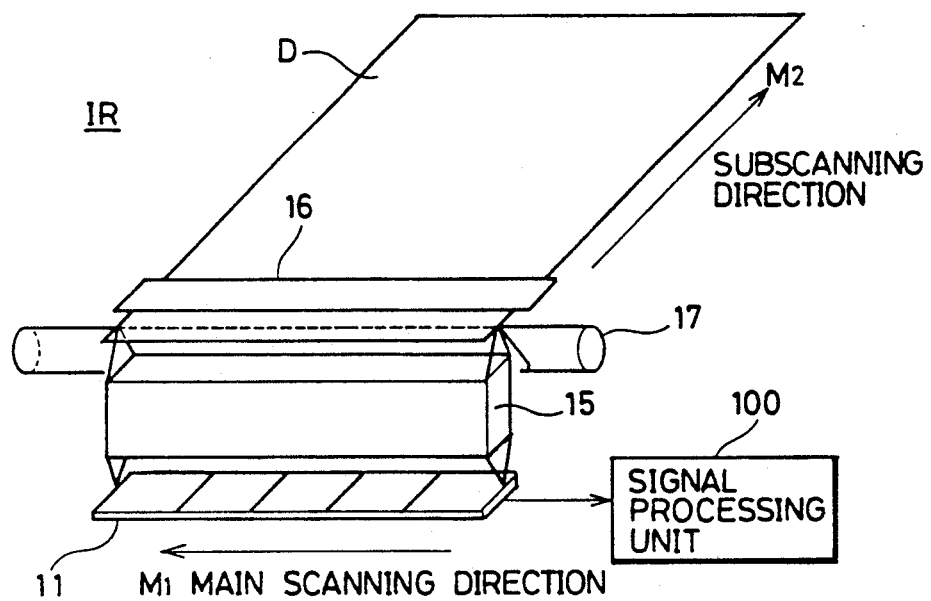
FIG. 4 is a perspective view schematically showing a major part of an image reader unit in accordance with the present invention.

FIG. 4 is a perspective view schematically showing a major portion of an image reader unit IR in accordance with the present invention.

Image reader unit IR is incorporated as means for reading an original D into a digital copier. A color copied image is formed by an electrophotographic process in a laser printer unit not shown in response to an output of image reader unit IR.

Original D placed on a platen glass not shown is read to be fractionized into pixels by an optical system shifting in the arrowed direction of M2 (subscanning direction). The optical system is an equal scale magnification type optical system comprised of an exposure lamp 17 for illuminating original D, a one-dimensional image sensor 11 disposed in the arrowed direction of M1 (main scanning direction), a rod lens array 15 and the like.

Image sensor 11 outputs image data including a plurality of pixel data. The output image data is applied to a signal processing unit 100. A white plate 16 of a uniform density that is to be a white reference image is provided on an original cover not shown covering the platen glass.

Figure 1:
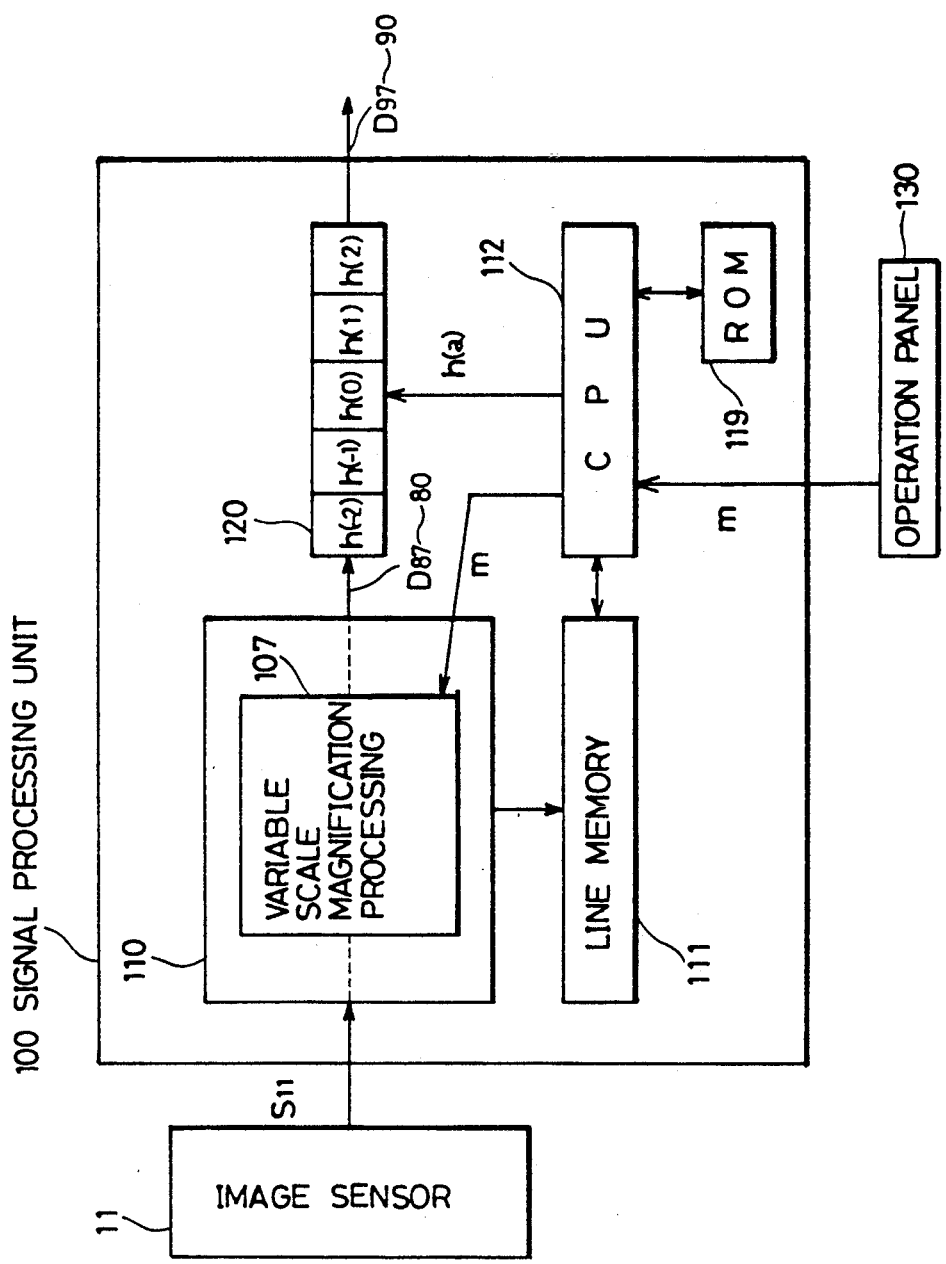
FIG. 1 is a block diagram showing a signal processing unit.

FIG. 1 is a block diagram of signal processing unit 100.

Signal processing unit 100 comprises a CPU (Central Processing Unit) 112 for controlling respective units of signal processing unit 100, an ROM 119 for storing various types of data such as programs and reference weighting matrixes, a line memory 111 for storing image data at a specific processing stage, a data processing unit 110 including various image processing circuits such as a variable scale magnification processing circuit 107, and a digital filter 120 of 1×5 in matrix size.

Data processing unit 110 quantizes a photoelectric conversion output signal S11 of image sensor 11 and converts the quantized signal S11 into image data of 8 bits. After that, data processing unit 110 outputs image data D87-80 subjected to various image processings (other processings) such as a shading correction processing, a variable scale magnification processing, a gamma correction processing, an image edition processing and a tone processing.

Digital filter 120 is provided to make the above-described image quality correction. Weighting matrixes h (−2)-h(2) of digital filter 120 are set to values that CPU 112 can collectively make both input-side correction and output-side correction as will be described later.

CPU 112 is provided with a magnification designating signal m from an operation panel 130. CPU 112 responds to magnification designating signal m to obtain the row of weighting matrixes h (a) to be applied to digital filter 120 by operation, and also applies magnification designating signal m to variable scale magnification processing circuit 107. Variable scale magnification processing circuit 107 enlarges or contracts input image data at a magnification corresponding to magnification designating signal m.

An operator can designate magnification m by operating operation panel 130.

Figure 5:
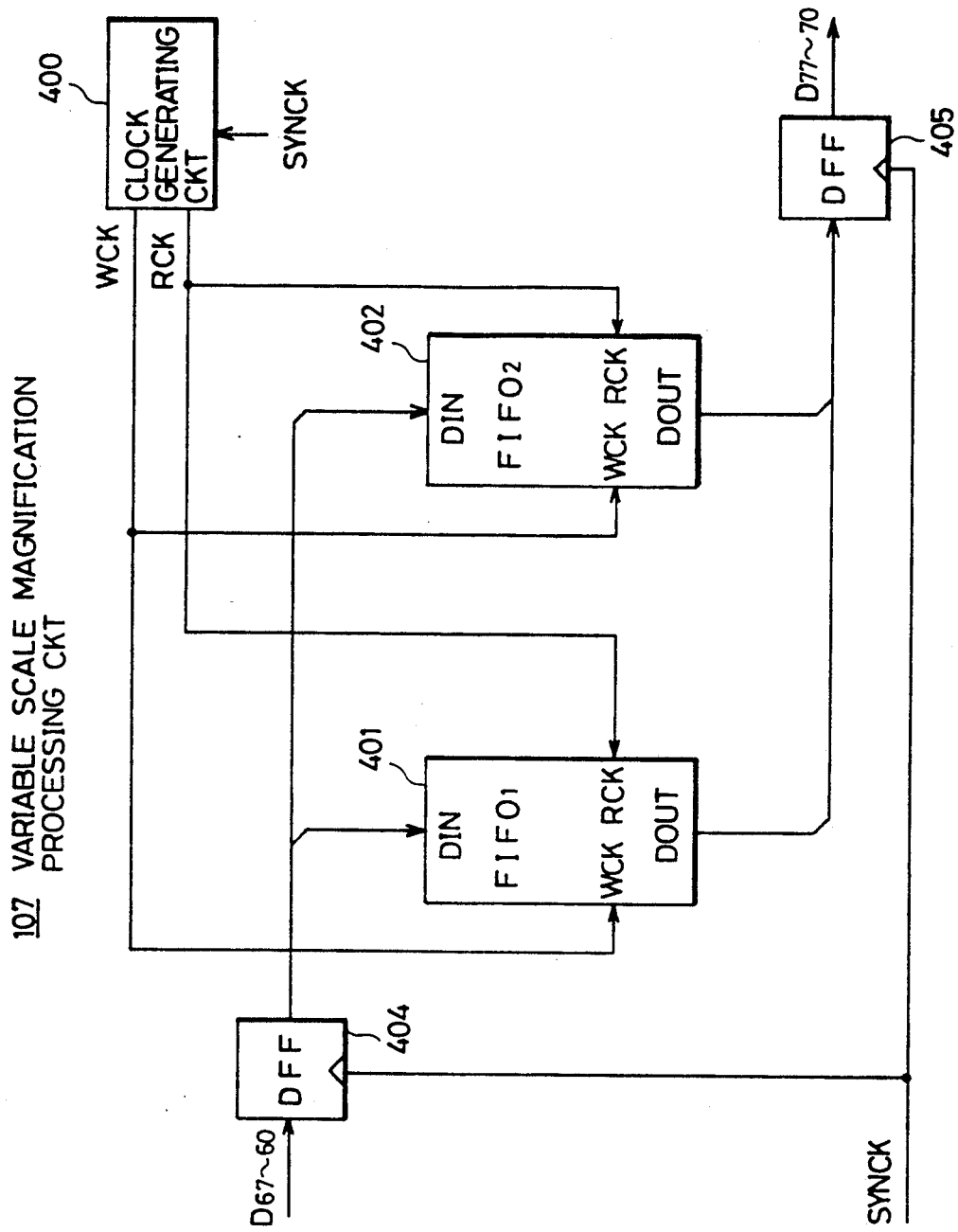
FIG. 5 is a circuit diagram of a variable scale magnification processing circuit.

FIG. 5 is a circuit diagram of variable scale magnification processing circuit 107.

Variable scale magnification processing circuit 107 comprises a clock generating circuit 400 for outputting a write clock signal WCK and a read clock signal RCK in parallel, a set of FIFO memories 401 and 402 for alternately writing and reading in the cycle of one line image data D67-60 which are sequentially input from a preceding stage, latch circuits 404 and 405 comprised of D-flipflops for determining the timing of input and output, and the like. Variable scale magnification processing circuit 107 outputs image data D77-70 which are produced by subjecting image data D67-60 input from the preceding stage to a variable scale magnification processing for contracting or enlarging an original image by skipping or interpolation.

Latch circuits 404 and 405 carry out a latching operation in accordance with a pixel clock signal SYNCK for defining the timing of data transmission.

Clock generating circuit 400 generates a variable scale magnification clock signal which is produced by skipping pulses of pixel clock signal SYNCK in a predetermined cycle, in response to variable scale magnification data applied from CPU 112. When a variable scale magnification is set to "1", i.e., an equal-scale copied image is formed, pixel clock signal SYNCK is not skipped, so that the pulse timing of the variable scale magnification clock signal becomes equal to that of pixel clock signal SYNCK.

When a contracted image is formed, clock generating circuit 400 outputs a variable scale magnification clock signal as write clock signal WCK and at the same time outputs pixel clock signal SYNCK as read clock signal RCK. Conversely, when an enlarged image is formed, clock generating circuit 400 outputs pixel clock signal SYNCK as write clock signal WCK and at the same time outputs a variable scale magnification clock signal as read clock signal RCK.

If FIFO memories 401 and 402 are made access by clock signals WCK and RCK having a different number of pulses per unit time, image data D77-70 corresponding to a variable-scale magnified image is generated.

Figure 6:
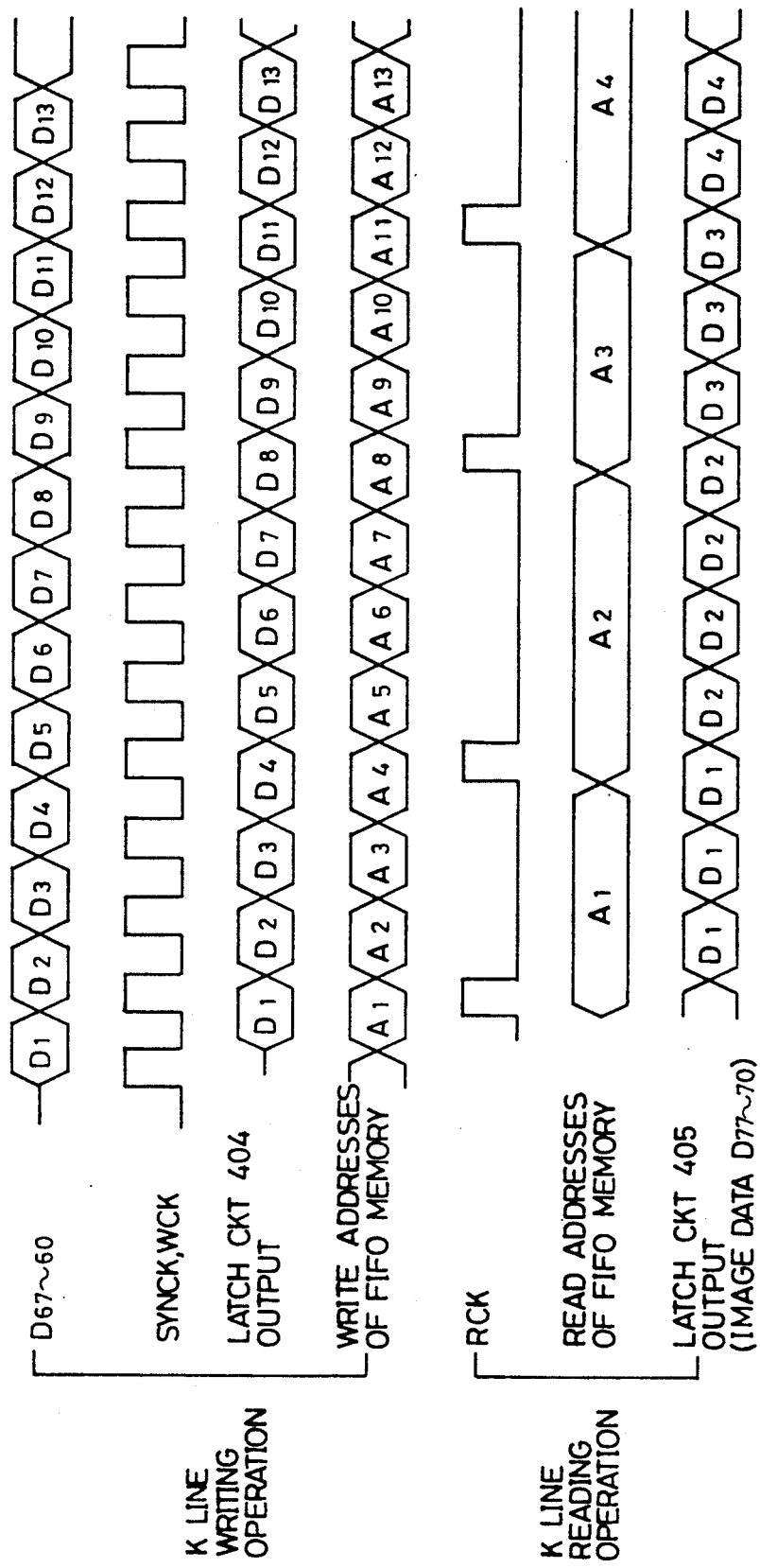
FIG. 6 is a time chart showing a variable scale magnification processing in enlargement.

FIG. 6 is a time chart showing a variable scale magnification processing in enlargement.

Although FIG. 6 shows both the writing and reading of image data D67-60 corresponding to a single line, the writing and reading for a single line are actually alternately carried out for each line cycle as described above.

Referring also to FIG. 5, when an enlarged image with a variable scale magnification being "3.5" is formed, clock generating circuit 400 generates a variable scale magnification clock signal by repeating an operation of first skipping two pulses and leaving one pulse of pixel clock signal SYNCK, and then skipping three pulses thereof. After that, clock generating circuit 400 outputs the generated variable scale magnification clock signal as read clock signal RCK and pixel clock signal SYNCK as write clock signal WCK.

Latch circuit 404 latches images data D67-60 which are input in the order of arrangement of pixels in the main scanning direction from the preceding state, for each pixel in accordance with pixel clock signal SYNCK.

Assume that processing of odd lines, for example, is carried out. Data Dj (j=1, 2, 3 ...) corresponding to respective pixels latched in latch circuit 404 is written in FIFO memory 401. At that time, since write clock signal WCK is identical to pixel clock signal SYNCK, a write address Aj (j=1, 2, 3 ...) of FiFO memory 401 is incremented in accordance with pixel clock signal SYNCK, so that data Dj corresponding to one line is written into FIFO memory 401 without any dropping.

However, since reading from FIFO memory 401 is carried out in response to a variable scale magnification clock signal, a period for odd addressing corresponds to 3 cycles of pixel clock signal SYNCK, and a period for even addressing to 4 cycles of pixel clock signal SYNCK. Accordingly, latch circuit 405 outputs, in accordance with pixel clock signal SYNCK, image data D77-70 in which odd pixels are increased three by three and even pixels four by four.

If an image is formed in response to image data D77-70 thus generated, a copied image which is made by enlarging an original image by 3.5 times in the main scanning direction is obtained. An enlargement of the original image in the subscanning direction is realized by decreasing a scanning speed in the subscanning direction upon reading original D.

Figure 2:
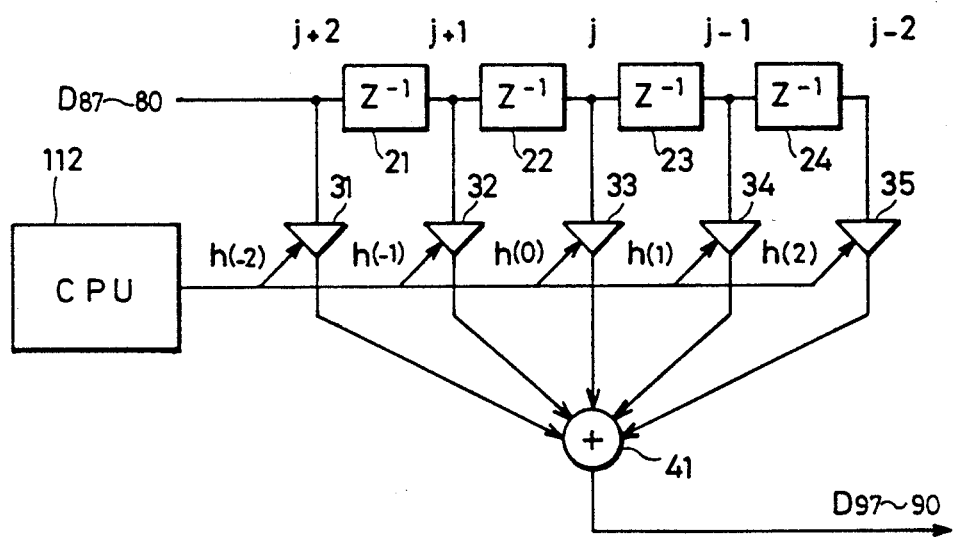
FIG. 2 is a circuit diagram of a digital filter.

FIG. 2 is a circuit diagram of digital filter 120.

Digital filter 120 is a non-recursive filter comprised of delay circuits 21-24, multipliers 31-35 and an adder 41.

Delay circuits 21-24 are provided to sequentially delay pixel by pixel image data D87-80 input from data processing unit 110. An output of second delay circuit 22 corresponds to a subject pixel (j) for a filter processing.

Respective multiplicators of multipliers 31-35, i.e., weighting matrixes h (−2), h (−1), h (0), h (1) and h (2) for filter processing are made variable and set to values corresponding to variable scale magnification m by a coefficient setting processing executed by CPU 112.

Since digital filter 120 of this embodiment is provided in a succeeding stage of data processing unit 110, it is necessary to vary depending on variable scale magnifications the contents of the input-side correction out of the image quality correction made by digital filter 120. That is, the contents of the image quality correction made by digital filter 120 can be expressed as a function of spatial frequency (two-dimensional frequency) in the following expression (1):

$$H(\omega) = m \cdot Ha(m\omega) \cdot Hb(\omega) \qquad (1)$$

$\omega$:angular frequency
m:variable scale magnification where m·Ha(mω) indicates the contents of the input-side correction, and Hb(ω) indicates the contents of the output-side correction.

If inverse Fourier transformation is made for both sides of the above expression (1), weighting matrixes of digital filter 120 [h(a):a=−2, −1, 0, 1, 2] can be expressed as in the following expression (2):

$$h(a) = [(1/m) \cdot ha(a/m)] * hb(a) \qquad (2)$$

where a symbol "*" indicates a convolution operation.
That is, the following relation is defined:

$$f(x, y) * g(x, y) = \sum_{s=0}^{X-1} \sum_{t=0}^{Y-1} f(x, y)h(x - s, y - t)$$

where
x = (0, 1, 2, ..., X−1)
y = (0, 1, 2, ..., Y−1)

Thus, in this embodiment, if $hc(a) = (1/m) \cdot ha(a/m)$ is satisfied, $$h(a) = \sum_{s=-2}^{2} hc(s) \cdot hb(a - s)$$

is satisfied.

In the above equation, ha (a) and hb (a) are a function or a coefficient matrix indicating the rows of weighting matrixes for the input-side correction and the output-side correction, respectively.

Figure 3:
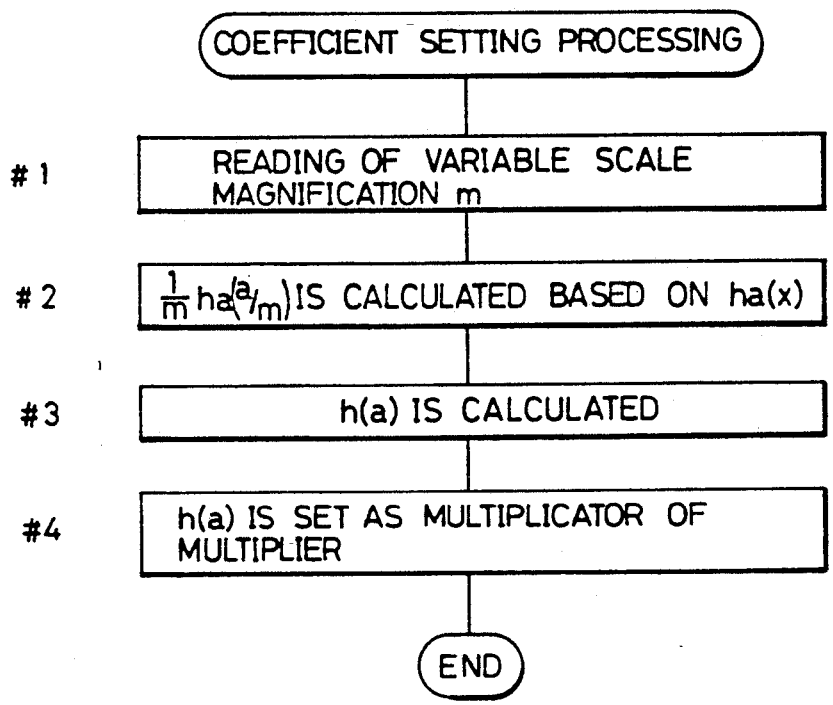
FIG. 3 is a flow chart showing a coefficient setting processing.

FIG. 3 is a flow chart of a coefficient setting processing.

CPU 112 first reads variable scale magnification m specified by a keying operation through the operation panel in step #1.

Figure 7:
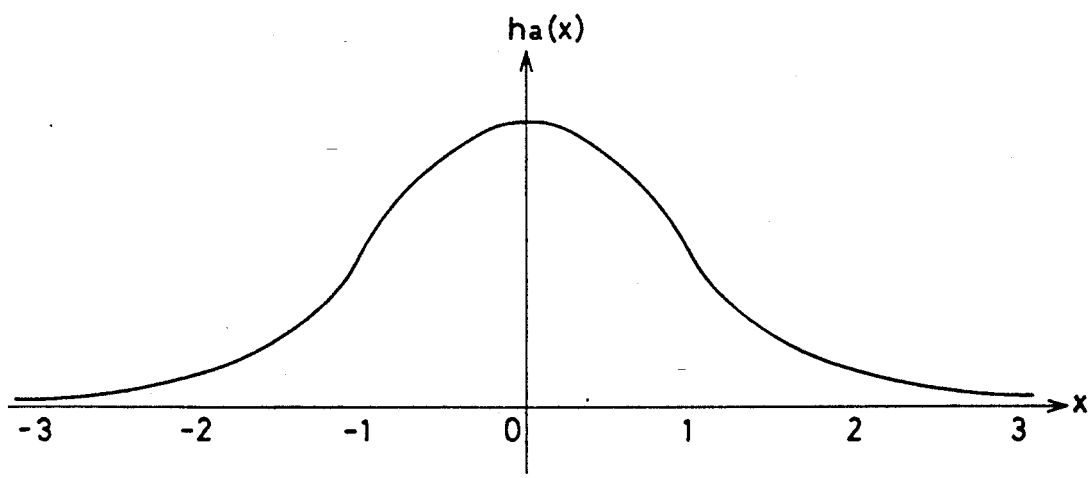
FIG. 7 is a graph showing a function expressed by ha (x).

Then, in step #2, a weighting matrix $[(1/1) \cdot ha(a/1)] = ha(a)$ corresponding to the input-side correction provided when the variable scale magnification stored in advance in ROM 113 is "1" is read, and a weighting matrix $[(1/m) \cdot ha(a/m)]$ corresponding to the input-side correction provided when the variable scale magnification is "m" is obtained in accordance with the read weighting matrix ha (a) and the variable scale magnification m input from operation panel 130.

ha (x) can be expressed as a function shown in, e.g., FIG. 7. In this embodiment, ha (x) where x = −2, −1, 0, 1, 2 is satisfied is stored in advance, and a weighting matrix $[(1/m) \cdot ha(x/m)]$ is obtained approximately by calculation based on the stored value ha (x).

Then, a weighting matrix hb (a) stored in ROM 113 is read, and weighting matrix h (a) is obtained by the convolution operation of expression (2) (step #3).

After that, respective weighting matrixes h (−2), h (−1), h (0), h (1) and h (2) are set as multiplicators in respective multipliers 31, 32, 33, 34 and 35 (step #4).

According to the foregoing embodiment, since the contents of the image quality correction is optimized by setting weighting matrixes corresponding to variable scale magnification m, the image quality can be stabilized irrespectively of variable scale magnification m. Also, since weighting matrixes are obtained by operation based on the weighting matrix for the input-side correction, the weighting matrix for the output-side correction and variable scale magnification m, a large memory capacity is unnecessary as compared with the case where various weighting matrixes corresponding to variable scale magnification m have to be stored in advance. Also, an image quality can easily be stabilized with respect to arbitrary variable scale magnification m.

While an image quality correction is made by employing digital filter 120 corresponding to a pixel row of one line in the foregoing embodiment, an image quality correction may be made by a digital filter of a matrix size of k×l (k, l is arbitrary odd numbers) over a plurality of lines. In that case, a variable scale magnification in the main scanning direction may be different from that in the subscanning direction.

While the description has been made on the case where a weighting matrix corresponding to arbitrary variable scale magnification m is calculated based on a weighting matrix corresponding to an image quality correction provided when variable scale magnification m is "1" in the foregoing embodiment, a more accurate image quality correction can be achieved by such approach that weighting matrixes corresponding to a plurality of specific values as variable scale magnification m are stored in advance, and when variable scale magnification m is provided, a weighting matrix corresponding to magnification m is calculated based on a weighting matrix corresponding to a specific value closest to magnification m.

More specifically, the value of a function ha (x) corresponding to x by 0.1 is stored in ROM 119. When x = a/m = 0.666 ... is satisfied where m = 1.5, a = 1, for example, ha (a/m) may be approximately obtained from the values of ha (0.6) and ha (0.7).

While non-recursive digital filter 120 has been illustrated in the foregoing embodiment, the present invention is applicable also to a recursive filter.

While such an example has been shown that an image quality correction is made by digital filter 120 after the variable scale magnification processing by variable scale magnification processing circuit 107, in the foregoing embodiment, the row of weighting matrixes h (a) can be obtained by the following expression (3).

$$h(a) = ha(a) * [m \cdot hb(m \cdot a)] \quad (3)$$

Although the present invention has been described and illustrated in detail, it is clearly understood that the same is by way of illustration and example only and is not to be taken by way of limitation, the spirit and scope of the present invention being limited only by the terms of the appended claim.

What is claimed is:

1. An image processing apparatus for processing image data including a plurality of pixel data, comprising:
    variable scale magnification means for varying the magnification of an image corresponding to said image data by increasing or decreasing the number of pixel data included in said image data;
    first memory means for storing a first weighting coefficient group;
    second memory means for storing a predetermined correction factor;
    weighting coefficient group determining means for determining a second weighting coefficient group in accordance with said magnification and said correction factor stored in said second memory means;
    operation means for operating a third weighting coefficient group from said first weighting coefficient group stored in said first memory means and from said second weighting coefficient group; and
    filtering means for correcting said image data by employing a digital filter including said third weighting coefficient group obtained by said operation means.

2. The image processing apparatus according to claim 1, wherein
    said filtering means is provided at a preceding stage of said variable scale magnification means.

3. The image processing apparatus according to claim 1, wherein
    said filtering means is provided at a succeeding stage of said variable scale magnification means.

4. The image processing apparatus according to claim 1, further comprising
input means for inputting said magnification, wherein said variable scale magnification means increases said pixel data in a variable scale magnification direction in accordance with said magnification input by said input means.

5. The image processing apparatus according to claim 1, further comprising
input means for inputting said magnification, wherein said variable scale magnification means skips from said image data to said pixel data by the number corresponding to said magnification input by said input means.

6. The image processing apparatus according to claim 1, wherein
said weighting coefficient group determining means carries out the following operation:

$$hc(x) = (1/m) \cdot ha(x/m)$$

wherein hc (x) is said second weighting coefficient group, m is said magnification, ha (x/m) is said correction factor and x is $[-X/2, \ldots, -1, 0, 1, \ldots, X/2]$ (X is arbitrary natural number).

7. The image processing apparatus according to claim 6, wherein
said operation means carries out the following operation:

$$h(x) = hc(x) * hb(x)$$

wherein h (x) is said third weighting coefficient group, hb (x) is a first weighting coefficient group, and * is an operator indicating convolution operation.

8. The image processing apparatus according to claim 1, wherein
said operation means carries out the following operation:

$$h(x,y) = hc(x,y) * hb(x,y)$$

wherein h (x,y) is said third weighting coefficient group, hc (x,y) is said second weighting coefficient group, hb (x,y) is a first weighting coefficient group, and * is an operator indicating convolution operation.

9. An image processing apparatus for processing image data including a plurality of pixel data, comprising:
input means for inputting a variable scale magnification of an image;
variable scale magnification means for increasing or decreasing the number of pixel data included in said image data in accordance with said variable scale magnification input by said input means;
first memory means for storing a first weighting matrix;
second memory means for storing a predetermined correction factor;
operation means for operating a second weighting matrix from said variable scale magnification, said function and said first weighting matrix; and
filtering means for correcting said image data by employing a digital filter including said second weighting matrix obtained by said operation means.

10. The image processing apparatus according to claim 9, wherein
said filtering means is provided at a preceding stage of said variable scale magnification means.

11. The image processing apparatus according to claim 9, wherein
said filtering means is provided at a succeeding stage of said variable scale magnification means.

12. An image processing apparatus for subjecting image data including a plurality of pixel data to a variable scale magnification processing at arbitrary magnification and also correcting an image quality of the image data, said apparatus comprising:
variable scale magnification means for varying said image data on a variable scale in correspondence with a magnification designating signal;
first memory means for storing first weighting coefficients;
second memory means for storing second weighting coefficients;
operation means for operating third weighting coefficients from said first weighting coefficients stored in said first memory means, said second weighting coefficients stored in said second memory means and said magnification; and
filtering means for referring to pixel data corresponding to a plurality of peripheral pixels in ratios determined by matrixes including said third weighting coefficients, to correct said pixel data.

13. The image processing apparatus according to claim 12, wherein
said filtering means corrects image data that is not yet subjected to a variable scale magnification processing by said variable scale magnification means.

14. The image processing apparatus according to claim 12, wherein
said filtering means corrects image data that is subjected to a variable scale magnification processing by said variable scale magnification means.

15. The image processing apparatus according to claim 12, wherein
said variable scale magnification means increases the number of said pixel data in a variable scale magnifying direction in accordance with said magnification.

16. The image processing apparatus according to claim 12, wherein
said variable scale magnification means skips said pixel data by the number corresponding to said magnification from said image data.

17. An image processing apparatus for subjecting image data including a plurality of pixel data to a variable scale magnification processing at arbitrary magnification and also correcting an image quality of the image data, said apparatus comprising:
variable scale magnification means for varying said image data on a variable scale in accordance with a magnification designating signal;
filtering means for referring to pixel data corresponding to a plurality of peripheral pixels in ratios determined by matrixes of weighting coefficients, to correct said pixel data, said filter means including
first memory means for storing first weighting coefficients for correcting said image data that is not yet magnified on a variable scale,
second memory means for storing second weighting coefficients for correcting said image data magnified on a variable scale, and operation means for operating said matrixes from said first weighting coefficients stored in said first memory means and from said second weighting coefficients stored in said second memory means.

18. The image processing apparatus according to claim 17, wherein
said filtering means corrects image data that is not yet subjected to a variable scale magnification processing by said variable scale magnification means.

19. The image processing apparatus according to claim 17, wherein
said filtering means corrects image data subjected to a variable scale magnification processing by said variable scale magnification means.

* * * * *